United States Patent [19]

Olson et al.

[11] 4,382,109

[45] May 3, 1983

[54] ABRASION RESISTANT SILICONE COATED THERMOPLASTIC ARTICLE AND METHOD FOR MAKING

[75] Inventors: Daniel R. Olson; Ona V. Orkin, both of Schenectady, N.Y.

[73] Assignee: General Electric Company, Schenectady, N.Y.

[21] Appl. No.: 290,984

[22] Filed: Aug. 7, 1981

[51] Int. Cl.³ .......................... B32B 5/16; B32B 27/30
[52] U.S. Cl. ............................ 428/331; 427/385.5; 427/387; 427/393.5; 427/412.1; 427/412.5; 427/419.8; 428/411; 428/412; 428/447; 428/451; 428/522; 524/102; 524/202; 524/203
[58] Field of Search .............. 260/45.75 N; 428/412, 428/447, 522, 451, 331, 473.5, 483, 411; 427/387, 385.5, 393.5, 412.1, 412.5, 419.8; 524/102, 202, 203

[56] References Cited

U.S. PATENT DOCUMENTS

| | | | |
|---|---|---|---|
| 3,640,928 | 2/1972 | Murayama | 524/99 |
| 3,994,840 | 11/1976 | Kajimura | 260/45.75 N |
| 4,159,206 | 6/1979 | Armbruster et al. | 428/447 |
| 4,208,465 | 6/1980 | Chang | 428/418 |
| 4,210,699 | 7/1980 | Schroeter | 428/412 |
| 4,224,378 | 9/1980 | Schroeter | 428/412 |
| 4,239,798 | 12/1980 | Schroeter | 428/412 |
| 4,242,381 | 12/1980 | Goossens | 428/412 |
| 4,242,383 | 12/1980 | Goossens | 428/412 |
| 4,308,317 | 12/1981 | Olson | 428/412 |
| 4,353,959 | 10/1982 | Olson | 428/412 |

OTHER PUBLICATIONS

"Tinuvin ® 770", *Ciba Geigy Tech. Bulletin.*

*Primary Examiner*—Ellis P. Robinson
*Attorney, Agent, or Firm*—William A. Teoli; James C. Davis, Jr.; James Magee, Jr.

[57] ABSTRACT

A method is provided for making abrasion resistant, non-opaque thermoplastic articles, for example, silicone-coated polycarbonate sheet useful as glazing material. A mixture of a certain UV absorber, for example a cyanoacrylate, and light stabilizer, such as a piperidine derivative, has been found to impart improved weathering resistance to the silicon-coated thermoplastic articles when used as part of an acrylic primer coating between the silicone top coat and the thermoplastic substrate.

12 Claims, No Drawings

ABRASION RESISTANT SILICONE COATED THERMOPLASTIC ARTICLE AND METHOD FOR MAKING

BACKGROUND OF THE INVENTION

Prior to the present invention, as shown for example by Goossens et al., U.S. Pat. Nos. 4,242,381 and 4,242,383, and Schroeter et al., U.S. Pat. Nos. 4,210,699, 4,224,378, and 4,239,798, assigned to the same assignee as the present invention, acrylic primers were used on polycarbonate substrates to improve the adhesion characteristics of the filled or unfilled silicone top coats on polycarbonate substrate.

The acrylic primer of the prior art can include thermoplastic acrylic polymers with and without functional groups, for example, hydroxy, carboxyl, amine, etc., and thermoset acrylic polymers. Although improved adhesion of the silicon top-coat on polycarbonate substrates has been effected by using an acrylic primer, the silicone coated polycarbonate articles often did not satisfy the stringent weathering resistance requirements of the automotive industry. A convenient way of determining resistance to weathering which is recognized by the automotive industry is to test silicone-coated thermoplastic slabs in a QUV device, manufactured by the Q-Panel Company of Cleveland, Ohio. This device can be set to consecutive cycles of fluorescent UV light and high humidity at various times and temperatures. The present standards require the ability to pass a severe adhesion test after 600-1600 hours of aging.

The present invention is based on the discovery that improved weathering resistance of silicone-coated, acrylic primed thermoplastic substrates, for example, polycarbonate, can be achieved if there is used a particular combination of adhesion stabilizers in the acrylic primer. More particularly, optimum adhesion after extensive accelerated weathering can be achieved if the silicone top coat is applied onto a thermoplastic substrate primed with an acrylic resin containing a combination of a particular UV absorber and one or more particular light stabilizers as defined hereinafter.

STATEMENT OF THE INVENTION

There is included by the present invention coated, non-opaque thermoplastic articles having improved abrasion resistance comprising
(A) a thermoplastic substrate,
(B) a cured intermediate acrylic primer layer comprising,
 (1) acrylic polymer and
 (2) 5% to 50% by weight of the cured intermediate acrylic primer layer of a mixture of 1 to 10 parts of a UV absorber selected from the class consisting of cyanoacrylate, hydroxybenzophenone and benzotriazole, per part of an organic or organometallic stabilizer capable of enhancing the resistance of organic polymers to degradation or breakdown resulting from exposure to UV light and having an extinction coefficient of less than about 10,000 at max between 280 and 400 nm, and
(C) a cured silicone top coat durably adhered to the thermoplastic substrate.

The present invention also includes a method for making a coated, non-opaque, abrasion resistant, thermoplastic articles which comprises,
(1) priming a thermoplastic substrate with an acrylic primer composition comprising acrylic polymer and 5% to 50% by weight based on the weight of acrylic primer composition of a mixture comprising 1 to 10 parts of a UV absorber selected from the class consisting of cyanoacrylate, hydroxybenzophenone and benzotriazole per part of an organic or organometallic stabilizer capable of enhancing the resistance of organic polymers to degradation or breakdown resulting from exposure to UV light and having an extinction coefficient of less than about 10,000 at max between 280 and 400 nm, and
(2) applying a silicone coating composition onto the primed thermoplastic substrate and thereafter effecting the cure of the silicone coating composition to form a hard abrasion resistant coating composition.

Among the thermoplastic substrates which can be treated in accordance with the practice of the present invention to render such thermoplastic substrates abrasion resistant are, for example, Lexan polycarbonate, Noryl polyphenylene oxide, Ultem polyetherimide, all manufactured by the General Electric Company, Mylar polyethyleneterephthalate, and other high performance thermoplastic substrates requiring the treatment of a silicone top coat to improve the abrasion resistance of such high performance thermoplastics. Preferably, the thermoplastic substrate is an aromatic polycarbonate having 10–400 chemically combined units of the formula,

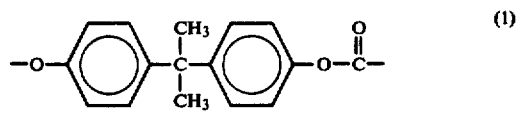

(1)

The polycarbonates of formula (1), preferably should have an intrinsic viscosity of 0.3 and 1.0 and a particularly preferred viscosity is 0.40 to 0.65 as measured at 25° C. in methylene chloride.

The acrylic primer utilized in the practice of the present invention can employ thermoplastic acrylic polymer as well as thermosetting acrylic polymer. Some of the thermoplastic acrylic polymers used in the practice of the present invention are shown in the Encyclopedia of Polymer Science & Technology, Vol. 1, Interscience Publishers, John Wiley & Sons, Inc., (1964), page 246. For example, the term "thermoplastic acrylic polymer" means polymers resulting from the polymerization of one or more acrylic acids, or methacrylic acids or ester thereof, such as methacrylic acid ester monomers. Some of these monomers can be represented by the general formula,

(2)

where Y is H or a methyl radical, R is a $C_{(1-12)}$ alkyl radical, X is a member selected from hydrogen, hydroxy, carboxy, amine, epoxide, amide, $-SH$, $SO_3H$, $COOR^1$, and $Si(OR^2)_3$, where $R^1$ and $R^2$ are $C_{(1-20)}$ organic radicals.

Radicals included by R, $R^1$, and $R^2$ are for example, ethyl, methyl, propyl, isopropyl, butyl, t-butyl, pentyl, hexyl, heptyl, 2-ethylhexyl, and octyl. In instances where the aforementioned $R-R^2$ radicals can represent more than one radical, these radicals can be the same or different.

There are included within the acrylic acid ester monomers of formula (2) compounds such as methyl acrylate, isopropyl acrylate, n-propyl acrylate, n-butyl acrylate, isobutyl acrylate, sec-butyl acrylate, 2-ethylhexyl acrylate, etc. Exemplary methacrylic acid ester monomers of formula (2) include methyl methacrylate, ethyl methacrylate, n-butyl methacrylate, isobutyl methacrylate, hexyl methacrylate, etc.

Functional acrylic ester monomers also are included in formula (2) which are shown as follows CH₂=C(CH₃)COOCH₂CH₂OH
    CH₂=CHCOOCH₂CH₂OH
    CH₂=CHCOOCH₂CHOHCH₃
    CH₂=CHCOOCH₂CHNH₂CH₃₄
    CH₂=CCH₃COOCH₂CH₂CH₂NH₂
    CH₂=CHCOOCH₂CH₂NH₂
    CH₂=CHCOOCH₂CH₂Si(OCH₃)₃
    CH₂=CCH₃COOCH₂CH₂Si(OCH₃)₃
    CH₂=CHCOOCH₂CH₂COOH
    CH₂=CCH₃COOCH₂CH₂CH₂CH₂COOH
    CH₂=CCH₃COO(CH₂)₆SH

CH₂=CHCOOCH₂CH—CH₃
                   |
                   CH₂SO₃H

CH₂=CHCOOCH₂CH₂CH₂CONH₂
    CH₂=CCH₃COOCH₂CHCH₃
    CH₂=CCH₃COOCH₂CH₂CH₂COOCH₂CH₃

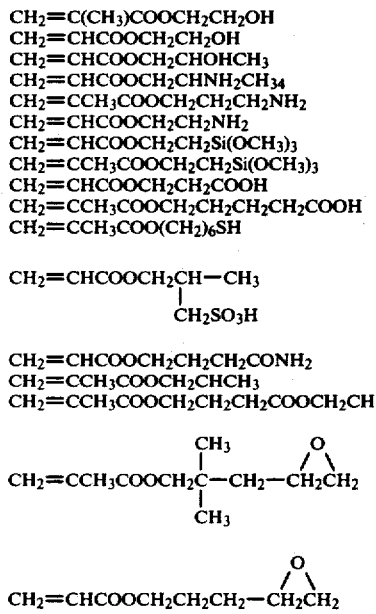

CH₃      O
                 |       / \
    CH₂=CCH₃COOCH₂C—CH₂—CH₂CH₂
                 |
                 CH₃

O
                             / \
    CH₂=CHCOOCH₂CH₂CH₂—CH₂CH₂

Copolymers of the above acrylate and/or methacrylate monomers are also included within the term "thermoplastic acrylic polymers" as it appears herein. The polymerization of the monomeric acrylic acid esters and methacrylic acid esters to provide the thermoplastic acrylic polymers useful in the practice of the invention may be accomplished by any of the well known polymerization techniques. The thermoplastic acrylic polymers having a molecular weight of at least about 15,000 generally are preferred in the practice of the instant invention.

The thermoplastic acrylic polymers useful in the practice of the instant invention include acrylic ester homopolymers derived from acrylic acid ester monomers; methacrylate ester homopolymers derived from methacrylic acid ester monomers; and copolymers derived from two different acrylic acid ester monomers, or two different methacrylic acid ester monomers, or an acrylic acid ester monomer and a methacrylic acid ester monomer.

Mixtures of two or more of the aforedescribed thermoplastic acrylic polymers, e.g., two or more different acrylic ester copolymers, two or more different methacrylic ester homopolymers, two or more different methacrylic ester copolymers, an acrylic ester homopolymer and a methacrylic ester homopolymer, an acrylic ester copolymer and an acrylic ester copolymer, and acrylic ester homopolymer and a methacrylic ester copolymer, etc., can also be used in the present invention.

The thermoplastic acrylic polymers are in general applied as primers from a primer composition containing said thermoplastic acrylic polymer and a volatile solvent, either organic or inorganic in nature which is inert, i.e., will not react with the polycarbonate part to be treated, but which is capable of dissolving the thermoplastic acrylic polymers. Generally, the concentration of the thermoplastic acrylic polymer in the priming composition ranges from about 0.5 to about 25 percent by weight, preferably from about 1 to about 15%. Examples of suitable solvent systems include ethylene glycol diacetate, butoxyethanol, ethoxyethanol, butanol, propanol, 2-(2-methoxyethoxy)ethanol, toluene and combinations thereof.

Mixtures of two or more of the aforedescribed homopolymers or copolymers can also be used in the practice of the present invention.

For acceptable results, the thermoplastic acrylic polymers containing functional groups should have a molecular weight of at least 20,000, and preferably at least 50,000.

The thermoplastic acrylic polymers of the instant invention differ from thermosettable acrylic polymers in that these thermoplastic polymers are formed and applied as primers under conditions such that the functional groups do not react between themselves to effect a cross-linkage between the polymers.

Thermoplastic acrylic polymers, based on the use of monomers shown by formula (2), also can be in the form of an emulsion having from about 1 to about 10% by weight of acrylic solids based on the weight of the emulsion which can contain 20 to about 40% by weight of a hydroxy ether or alkanol having from 1 to 4 carbon atoms, and from 40 to about 78% by weight of water and the balance of the primer emulsion being about 5 to 50% by weight of the UV absorber-stabilizer mixture based on primer solids as defined hereinafter. This acrylic polymer emulsion concentrate is comprised of an acrylic polymer dispersed in water. The polymer is generally in the form of discrete spherical particles (approximately 0.1 micron in diameter) dispersed in water. Since the polymer particles are separate from the continuous aqueous phase, the viscosity of the dispersion or emulsion is relatively independent of the polymer's molecular weight. Consequently, the emulsion concentrate and, therefore, the primer emulsion composition can contain polymers of high molecular weight and yet have a relatively low viscosity.

A second component of the primer emulsion compositions is a hydroxy ether or alkanol containing from 1 to 4 carbon atoms. The hydroxy ethers are represented by the general formula,

R'—O—R"—OH where R' is an alkyl or an alkoxy alkyl radical containing from 1 to about 6 carbon atoms and R" is an alkylene radical containing from 1 to about 5 carbon atoms, provided that the sum of the carbon atoms present in R' and R" is from 3 to about 10. The alkanols containing from 1 to 4 carbon atoms include methanol, ethanol, propanol, isopropanol, butanol, tert-butanol, and the like. The emulsion composition is critical to the satisfactory performance of the primer emulsion composition in forming an effective primer layer. If no hydroxy ether or alkanol is present, or if an amount of hydroxy ether or alkanol less than about 20 weight percent is present, the primer emulsion composition does not flow evenly over the polycarbonate substrate, i.e., there is uneven distribution of the primer emulsion composition over the substrate with excessive concentrations of the primer emulsion composition in certain areas and the total absence of the primer emulsion composition in other areas. This results in an unevenly distributed and non-uniform primer layer being formed which, in turn, results in inferior adhesion of the silicon top coat and in a streaked appearance of the final product. If too much of the hydroxy ether or alkanol is present, i.e., amounts generally greater than about 40 weight weight percent, coagulation and precipitation of the acrylic solids will generally occur in time varying from minutes to several days. Thus, the emulsion composition contains an effective amount of hydroxy ether or alkanol, i.e., an amount sufficient to allow even flow and distribution of the emulsion composition on the substrate but insufficient to cause precipitation of the acrylic solids and coagulation of the emulsion. Generally, this effective amount ranges from about 20 to about 40 weight percent.

The thermosettable acrylic solids can be provided in the form of a thermosettable acrylic polymer emulsion concentrate or a solution. The thermosettable acrylic polymers present in the emulsion are well known in the art. Exemplary thermosettable acrylics which may be employed in the practice of this invention are set forth, for example, in Encyclopedia of Polymer Science and Technology, Vol. 1, Interscience Publishers, John Wiley & Sons, Inc., copyright 1964, at p. 273 et seq., and in Chemistry of Organic Film Formers, by D. H. Solomon, John Wiley & Sons, Inc., 1967. at p. 251 et seq., and the references cited therein, all of which are incorporated herein by reference.

These thermosettable acrylic polymers include: (I) acrylic copolymers having reactive functional groups which are capable of reacting between themselves to effect a cross-linkage thereof; (II) acrylic copolymers having reactive functional groups to which there is added an appropriate compatible cross-linking agent which will react with the functional groups to effect cross-linking; and (III) a mixture of two polymers having cross-linkable functional reactive groups.

Typically, the reactions involved in cross-linking the thermosettable acrylic polymers are reactions between, for example: epoxide functional groups and amine functional groups; epoxide functional groups and acid anhydride functional groups; epoxide functional groups and carboxyl functional groups, including phenolic hydroxyl groups; epoxide functional groups and N-methylol or N-methylol-ether; carboxyl functional groups and N-methylol or N-methylol-ether functional groups interreaction between carboxyl and isocyanate groups; reaction between hydroxyl, for example, polyols and isocyanate groups, and reactions between amine groups and N-methylol or N-methylol-ether groups. In the usual case of resin mixtures, the acrylic will be present in a major proportion, i.e., greater than 50 weight percent and, more typically, will be present in an amount in excess of about 70 percent. The needed functional group in the acrylic copolymer, which is the foundation of the thermosettable acrylic polymer, is provided by employing in the copolymerization a monomer which supplies the needed reactive functional group into the polymer chain. Usually, this copolymerizable functional group-supplying monomer will be present in small amounts, that is, on the order of 25 weight percent or less and, typically, between about 1 and 20 percent of the monomer mass which is polymerized. Exemplary of these functional group-supplying monomers are glycidyl acrylate, glycidyl methacrylate, allyl alycidyl ether, dimethylaminoethyl methacrylate, vinyl pyridine, tert-butylaminoethyl-methacrylate, maleic anhydride, itaconic anhydride, allyl alcohol, monoallyl ethers of polyols, hydroxyethyl methacrylate, hydroxypropyl methacrylate, hydroxypropyl acrylate, acrylamide, methacrylamide, maleamide, N-methylol-methacrylamide, vinyl isocyanate, allyl isocyanate. Usually, the other monomer which will be polymerized along with the monomer supplying the functional group is a lower ($C_1$–$C_2$) alkyl acrylic ester or mixtures thereof, e.g., methyl acrylate, ethyl acrylate, methyl methacrylate, ethyl methacrylate, or mixtures thereof, in an amount ranging between about 75 parts to about 99 parts and more typically, between about 80 parts to about 97 parts.

The thermosetting acrylic polymer emulsion concentrates generally useful in the practice of the instant invention are generally commercially available and are sold, for example, by Rohm & Haas, Philadelphia, PA, as their Rhoplex. Generally, these emulsion concentrates contain from about 40 to about 55% solids. However, in formulating the primer emulsion composition, it has been found desirable that the primer emulsion compositions contain from about 1 to about 10% by weight acrylic solids. Thus, it is generally necessary to dilute these commercially available emulsion concentrates by the addition of additional water thereto. These primer emulsion compositions may additionally contain curing catalysts for the acrylic polymers. If present, the catalyst is present in from about 0.05 to about 2 weight percent, based on the weight of acrylic solids. Examples of these catalysts include toluene sulfonic acid, citric acid, phosphorus acid, etc.

The above described thermosettable acrylic polymers also can be used as a solution in combination with one or more of the solvents shown for the thermoplastic acrylic polymers.

The thermoplastic or thermosetting acrylic polymers based on the polymerization of one or more acrylic monomers can be combined in accordance with the practice of the present invention, with a mixture of the UV absorber, for example, Uvinul ® N-539, manufactured by the General Aniline and Film Company of New York, New York, which has the formula,

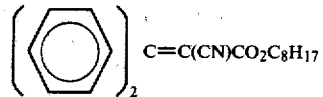

and a stabilizer as described below. In addition to Uvinul N-539, a cyanoacrylate, there also can be used hydroxybenzophenones and benzotriazoles which are further described on page 327 and pages 374–376 in Photodegradation, Photo-oxidation and Photo-stabilization of Polymers, by B. Ranby and J. F. Frabek, John Wiley & Sons, New York (1975).

Stabilizers which can be used in the practice of the present invention in combination with the aforedescribed UV absorbers are stabilizers such as Cyasorb ® UV 1084, manufactured by the American Cyanamid Company, of Bound Brook, New Jersey, Tinuvin ® 770 and 144, manufactured by the Ciba Gigy Corporation, of Ardsley, New York, Rylex ® NBC, manufactured by E. I. DuPont de Nemours Company, of Wilmington, Delaware, etc.

Some of the above UV stabilizers can be more particularly shown by the following formulas

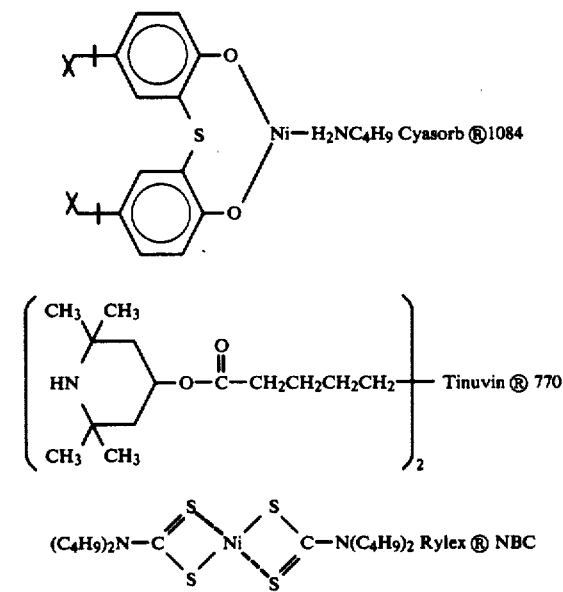

Additional stabilizers, sometimes referred to as "quenchers" are further shown on pages 379–381, Photo-degradation, Photo-oxidation and Photo-stabilization of Polymers, by B. Ranby and J. F. Frabek, John Wiley & Sons, New York (1975). In addition, as taught by K. B. Chakraborty et al, Chemy. Ind. (London) (1978), page 237, certain hindered amine compounds, based on piperidine, have the ability to react stoichiometrically with hydroperoxides which can exist on the surface of organic polymers to form stable nitroxyl radicals which are less likely to cause breakdown due to UV exposure. Further information about stabilizers is shown in U.S. Pat. No. 3,640,928, and in a preliminary technical bulletin of the polymer additives department, Ciba-Gigy Corporation, Ardsley, New York, entitled Tinuvin ® 770, Light Stabilizers for Plastics and Coatings.

The organopolysiloxane top coat composition which can be applied onto the primed thermoplastic substrate in accordance with the practice of the present invention, can be in the form of a heat curable organopolysiloxane composition or a heat curable silica filled organopolysiloxane composition. The heat curable organopolysiloxane composition free of silica is generally the partial hydrolysis and condensation product of at least one compound represented by the general formula, $$R^3{}_n SiZ_{(4-n)} \tag{3}$$

wherein $R^3$ represents a monovalent hydrocarbon radical and a halogenated monovalent hydrocarbon radical, Z represents a hydrolyzable group, and n may vary between 0 to 3 inclusive, preferably between 0 to 2 inclusive. More specifically, Z is independently a member such as halogen, alkoxy, acyloxy and aryloxy.

Preferably, $R^3$ represents an alkyl radical containing from 1 to about 8 carbon atoms such as methyl, ethyl, and propyl through octyl (both normal and isomeric), an alkenyl radical containing from 2 to about 8 carbon atoms, such as vinyl and the normal and isomeric forms of propenyl through octenyl, and the phenyl radical; z preferably represents an alkoxy radical containing from 1 to about 8 carbon atoms such as methoxy, ethoxy, propoxy, heptoxy, octoxy, and the like, an acyloxy radical containing from 2 to about 9 carbon atoms, such as acetoxy, propionoxy, butanoxy, pentanoxy, hexanoxy and the like, and a phenoxy radical.

Preferred compounds of formula (3) are silanes of the formula $$R^4{}_a Si(OR^5)_{4-a} \tag{4}$$

and silanes of the formula $$R^6{}_b Si(OCOR^7)_{4-b} \tag{5}$$

wherein $R^4$ and $R^6$ represent a monovalent hydrocarbon radical and a halogenated monovalent hydrocarbon radical, preferably an alkyl radical containing from 1 to about 8 carbon atoms, an alkenyl radical containing from 2 to about 8 carbon atoms, and the phenyl radical; $R^5$ and $R^7$ represent monovalent hydrocarbon radicals and halogenated monovalent radicals such as alkyl radicals and phenyl radicals, but are preferably alkyl radicals of 1 to 8 carbon atoms; a varies between 0 to 3 inclusive, preferably between 0 to 2 inclusive; and b varies between 0 to 3 inclusive, preferably 0 to 2 inclusive.

Upon hydrolysis, the compounds of formula (3) or more specifically those of formulas (4) and (5) convert to the corresponding silanols. Upon generation of the silanol, there is condensation of the hydroxyl substituents to form —Si—O—Si— bonding. The condensation is not complete, but rather the oganopolysiloxane retains a quantity of silicon-bonded hydroxyl groups. This partial condensate can be characterized as a further-curable, i.e., further condensable, siloxanol polymer. During curing of the further-curable organopolysiloxane, which has been deposited on the primed polycarbonate substrate, the residual hydroxyls condense to give a thermoset organopolysiloxane.

The curable organopolysiloxane may be formulated into the top coat composition as a solution of the siloxanol polymer in water and alcohol by-product, as a concentrated solution of siloxanol in water and alcohol by-product by evaporating off a substantial quantity of the alcohol by-product and water, or it may be formulated into the top coat composition as a solid partially precured product by evaporating off a substantial amount of alcohol by-product and water and then partially precuring the solidifying the concentrated product.

Examples of silicone top coats useful in the practice of the instant invention are the foregoing alkoxy and aryloxy functional silanes represented by formula (4) and acyloxy functional silanes represented by formula (4). Such alkoxy functional, aryloxy functional and acyloxy functional silanes are well known materials to silicone manufacturers and are easily obtainable. With respect to the acyloxy functional silanes, these materials are generally applied without any solvent since it has been found that the use of solvents in application of such top coat at time seriously degrades the applied silicone top coat. Preferably, the alkoxysilanes of formula (4), can be applied at 100% solids or from 20 to 100% solids. In the case of the acyloxy silanes where the solids are less than 100%, the silane is simply the water hydrolysis and partial condensation product of the foregoing acyloxy functional silanes. The alkoxy and aryloxy functional silanes of formula (5) are generally applied from a top coat composition containing solvents in a concentration of from about 20 to 95% by weight. Examples of solvents which may be used in the formulation of the top coat composition include methanol, ethanol, butanol, ethyl acetate, benzene, toluene, xylene, ethylene glycol and the like. However, the alkoxy and aryloxy functional silanes may also, similarly to the acyloxy functional silanes, be applied from a top coat composition which contains no solvents other than the alcohol by-product and water used to form the partial hydrolysis and condensation products of these silanes.

With respect to the foregoing aryloxy functional, alkoxy functional and acyloxy functional silanes mentioned above, such materials are well known in the art as, for instance, in U.S. Pat. Nos. 3,888,815 and 3,701,753, both of which are incorporated herein by reference.

A particular class of curable organopolysiloxanes which can be employed in the top coat compositions of the present invention are the partial hydrolysis and condensation products of alkoxy functional silanes, preferably alkyltrialkoxysilanes, preferably those alkyltrialkoxysilanes wherein the alkyl group contains from 1 to about 8 carbon atoms, and aryltrialkoxysilanes, preferably phenyltrialkoxysilanes, or mixtures thereof, wherein the alkoxy group contains from 1 to about 8 carbon atoms, such as, for example, methoxy, ethoxy, isopropoxy, butoxy, pentoxy, hexoxy, octoxy, and the like. These curable organopolysiloxanes are generally prepared by a process wherein the alkyltrialkoxysilane, aryltrialkoxysilane, or a mixture of alkyltrialkoxysilane and aryltrialkoxysilane is heated in the presence of water, wherein the molar ratio of water to total silane is at least about 1.5:1 and in the presence of an effective amount of a hydrolysis catalysts, such as a mineral acid, for example, HCl, for about 1 to about 10 hours at a temperature between ambient and reflux to produce a siloxane partial condensation product; the partial condensation product is then concentrated by heating to remove 50 to about 90 mole percent alkanol by-product and some water, and, thereafter, the concentrated partial condensation product is precured by heating at a temperature below the gel point thereof and generally in the range of about 70° C. to 300° C. to product the solvent-soluble, organopolysiloxane. This precured solvent-soluble organopolysiloxane is then dissolved in a suitable solvent to form the top coat composition and the primed polycarbonate substrate is then coated with this top coat composition. The solvent is then evaporated and the residual organopolysiloxane is cured to a thermoset state to provide a uniformity and tenaciously adhered to coat on the primed polycarbonate substrate. The curing is effected at elevated temperatures in the range of about 50° C. to 135° C. for times between about 1 hour to about 72 hours, depending on the temperature at which the cure is effected. The silicone top coat generally should be cured preferably at an elevated temperature to effect the proper cure but the temperature should be below the glass transition temperature of the polycarbonate. Of course, if the glass transition temperature of the polycarbonate is exceeded, then the polycarbonate part may become deformed and lose its utility.

Other silicones which can be utilized in the top coats of the instant invention are, for instance, silicone resins composed of trifunctional and difunctional units, silicone resins composed of trifunctional units, difunctional units and tetrafunctional units where the organo substituent groups in the trifunctional units may be selected from hydrocarbon radicals of 1 to about 8 carbon atoms and are preferably methyl, phenyl, and vinyl; and wherein the organo substituent groups in the difunctional siloxy units may be selected from hydrocarbon units of from 1 to abut 8 carbon atoms, preferably alkyl radicals, vinyl radicals and phenyl radicals. Such silicone resins usually have an organic radical to silicon atom ratio of 1:1 to 1.9:1, may have a silanol content that varies anywhere from 4 to 10 weight percent and optionally may have an alkoxy content that varies from 2 to 4%. The preparation of such silicone resins which may be utilized as top coats in the invention of the instant case are, for instance, to be found in U.S. Pat. Nos. 3,375,223, 3,435,001, 3,450,672, 3,790,527, 3,832,319, 3,865,766, 3,887,514 and 3,925,276.

In instances where the heat curable organopolysiloxane top coat is silica filled, there can be utilized in the practice of the present invention a silica filled organopolysiloxane coating composition, such as that described in U.S. Pat. Nos. 3,986,997 and 4,027,073, containing a organopolysiloxane and colloidal silica is applied onto the cured primer and is then cured to form a thermoset silica filled organopolysiloxane coating.

The silica filled, organopolysiloxane top coat composition comprises a dispersion of colloidal silica in a lower aliphatic alcohol-water solution of the partial condensate of a silanol having the formula,

$$R^8Si(OH)_3$$

wherein $R^8$ is selected from the group consisting of alkyl radicals containing from 1 to 3 carbon atoms, the vinyl radical, the 3,3,3-trifluoropropyl radical, the γ-glycidoxypropyl radical and the γ-methacryloxypropyl radical, with at least 70 percent by weight of said silanol being $CH_3Si(OH)_3$. This composition generally contains from about 10 to about 50% by weight of solids, said solids consisting essentially of a mixture of from about 10 to abut 70% by weight of colloidal silica and from about 30 to about 90 percent by weight of the partial condensate of a silanol. The partial condensate of a silanol, i.e., a siloxanol, is obtained, preferably, entirely from the condensation of $CH_3Si(OH)_3$, however, the partial condensate may also optionally be comprised of a major portion which is obtained from the condensation of $CH_3Si(OH)_3$ and a minor portion which is obtained from the condensation of monoethyltrisilanol, monopropyltrisilanol, monovinyltrisilanol, mono-γ-glycidoxypropyltrisilanol, or mixtures thereof. The composition further contains sufficient acid to provide a pH in the range of 3.0 to 6.0. The pH is maintained in this range in order to prevent premature gellation and increase the shelf life of the silica filled organopolysiloxane top coat composition and to obtain optimum properties in the cured coating. Suitable acids include both organic and inorganic acids such as hydrochloric, chloroacetic, acetic, citric, benzoic, formic, propionic, maleic, oxalic, glycolic and the like. The acid can be added to either the silane, which hydrolyzes to form the silanol component of the composition, or the hydrosol prior to mixing the two components.

The trisilanol component of the top coat composition of the present invention is generated in situ by the addition of the corresponding trialkoxysilanes to aqueous dispersions of colloidal silica. Suitable trialkoxysilanes are those containing methoxy, ethoxy, isopropoxy and sec-butoxy substituents. Upon generation of the silanol in the acidic aqueous medium, there is condensation of the hydroxyl substituents to form —Si—O—Si bonding. The condensation is not complete, but rather the siloxane retains an appreciably quantity of silicon-bonded hydroxyl groups, thus rendering the organopolysiloxane polymer soluble in the water-alcohol solvent. This soluble partial condensate can be characterized as a siloxanol polymer having at least one silicon-bonded hydroxyl group per every three —SiO— units. During curing of the top coating composition on the primer, these residual hydroxyl groups condense to give a silsesquioxane, $R^6SiO_{3/2}$.

The silica component of the top coat composition is present in the form of colloidal silica. Aqueous colloidal silica dispersions generally have a particle size in the range of 5 to 150 millimicrons in diameter. These silica dispersions are prepared by methods well known in the art and are commercially available. It is preferred to use colloidal silica having a particle size in the range of 10 to 30 millimicrons in diameter in order to obtain dispersions having a greater stability and to provide top coatings having superior optical properties.

The silica filled organopolysiloxane top coat compositions are prepared by adding trialkoxysilanes to colloidal silica hydrosol and adjusting the pH to a range of 3.0 to 6.0 by the addition of acid. As mentioned previously, the acid can be added to either the silane or the silica hydrosol before the two components are mixed.

Alcohol is generated during the hydrolysis of the trialkoxy silanes to the trisilanols. Depending upon the percent solids desired in the final coating composition, additional alcohol, water, or a water-miscible solvent can be added. Suitable alcohols are the lower aliphatic alcohols such as methanol, ethanol, isopropanol, t-butanol, and mixtures thereof. Generally, the solvent system should contain from about 20 to about 75 weight percent alcohol to ensure solubility of the siloxanol formed by the condensation of the silanol. If desired, a minor amount of an additional water-miscible polar solvent such as acetone, Butyl Cellosolve, and the like can be added to the water-alcohol solvent system. Generally, sufficient alcohol or water-alcohol solvent is added to give a composition containing from about 10 to about 50 percent by weight of solids, said solids generally comprising from about 10 to about 70 percent by weight of colloidal silica and from about 30 to about 90 percent by weight of the partial condensate of the silanol. The composition is allowed to age for a short period of time to ensure formation of the partial condensate of the silanol, i.e., the siloxanol. This condensation occurs upon generation of the silanol in the acidic aqueous medium through the hydroxyl substituents to form Si-—O—Si bonding. The condensation is not complete, resulting in a siloxane having an appreciable quantity of silicon-bonded hydroxyl group.

This aged, silica filled, organopolysiloxane top coat composition is then applied onto the primed polycarbonate by any of the commonly known methods such as dipping, spraying, flowcoating and the like. After the top coat composition is applied to the primed polycarbonate, the polycarbonate is air dried to evaporate the volatile solvents from the top coat composition. Thereafter, heat is applied to cure the top coat. During curing, the residual hydroxyls of the siloxane condense to give a silsesquioxane, $R^6SiO_{3/2}$. The result is a silica filled cross-linked organopolysiloxane top coat which is tenaciously adhered to the substrate and is highly resistant to scratching, abrasion, chemical solvents, and marring. Generally, the top coat contains from about 10 to about 70 weight percent silica and from about 30 to abut 90 weight percent of the organopolysiloxane present as the silsesquioxane, $R^6SiO_{3/2}$.

The top coat compositions containing the aforedescribed silicones are simply brushed, dipped, sprayed or flowed on top of the primer layer that is applied to the polycarbonate substrate. The solvent, or alcohol byproduct and water, present in the top coat composition is evaporated and the residual organopolysiloxane is cured to form a organopolysiloxane top coat. Preferably, the organopolysiloxane is cured at elevated temperatures. Although certain catalysts may be utilized to accelerate the cure of the organopolysiloxane, such catalysts are not necessary if the organopolysiloxane is cured by itself at the elevated temperature for a sufficient length of time.

The thickness of the top coat generally is dependent upon the method of application and upon the weight percent solids present in silica filled organopolysiloxane top coat composition. In general, the higher the percent solids, and the longer the application time, the greater the thickness of the top coat. It is preferred that the cured top coat have a thickness of from about 0.1 to about 0.7 mils, more preferably from 0.1 to about 0.5 mils, and most preferably from about 0.15 to about 0.3 mils.

In the practice of the invention, the thermoplastic substrate is treated or primed with the acrylic polymer which can be a thermoplastic acrylic polymer, or a thermosettable acrylic polymer. As previously indicated, if it is a thermoplastic acrylic polymer, it can be utilized in a solvent which is inert or will not react with the thermoplastic substrate. In instances where it is a thermosettable acrylic polymer, it can be utilized in the form of an aqueous emulsion obtaining a hydroxy ether or alkanol having from 1 to 4 carbon atoms. The acrylic primer also contains the aforementioned mixture of UV absorber and light stabilizer as previously defined which can be added to the acrylic priming mixture and uniformally dispersed therein prior to treating the thermoplastic substrate.

The primer composition can be applied onto the thermoplastic substrate by any one of the well known methods, such as spraying, dipping, rollcoating and the like. Depending upon whether the primer composition, is a thermoplastic primer or a thermosetting primer, the carrier solvent can be removed by air drying or by a drying oven. In instances where a thermosetting acrylic primer is used, heating of the said layer at a temperature of from about 90° C. to about 130° C. can be employed. Sufficient primer should be utilized to provide a thickness of from about 0.002 mil to about 1 mil and preferably, from about 0.001 mil to about 0.5 mil.

The primed thermoplastic substrate can then be further treated with the organopolysiloxane or a silicone top coat which can have a thickness of from about 0.1 to about 0.5 mil and preferably 0.15 to about 0.4 mil and most preferably from about 0.2 to abut 0.25 mil.

The thermoplastic substrates primed with the acrylic polymer and the silicone top coat in accordance with the practice of the present invention can be used as windshields, lamp envelopes, safety glasses, etc.

In order that those skilled in the art will be better able to practice the present invention, the following examples are given by way of illustration and not by way of limitation. All parts are by weight.

EXAMPLE 1

A priming solution was prepared by dissolving 12.5 parts Elvacite 2009, a medium molecular weight polymethylmethacrylate and 87.5 parts of a 20% ethylene glycol diacetate solution in butoxy ethanol. There was added to the primer solution 1.25 part of Uvinul N-539, a diphenylcyanoacrylate absorber of the General Aniline and Film Corporation of New York, New York, and 0.125 part of Cyasorb 1084. The resulting primer solution, after the ingredients had been thoroughly dispersed by stirring, was then flow coated onto a 4"×4"×0.25" Lexan polycarbonate panel, allowed to drain for 30 minutes and then heated at 125° C. for 15 minutes. The resulting primed polycarbonate panel was then allowed to stand at room temperature until cool.

A colloidal silica containing organopolysiloxane composition, as shown in Clark U.S. Pat. No. 3,986,997, was flow coated onto the primed panel, drained for 15 minutes and then heated at 125° C. for 1 hour. Based on method of preparation, there was obtained a polycarbonate article having a primer layer of a thermoplastic polymethylmethacrylate containing a mixture of Uvinul N-539 and Cyasorb 1084 and an abrasion resistant silicone top coat.

The above procedure was repeated, except that additional polycarbonate panels were treated with polymethylmethacrylate primer solution containing 1.25 parts of Uvinul N-539 and 0.125 part by weight of Tinuvin 770, a stabilizer manufactured by Ciba-Gigy Company of Ardsley, N.Y. An additional polycarbonate panel was treated utilizing a primer as previously defined containing combination of 1.25 parts of Uvinul N-539 and 0.125 part Rylex NBC, a stabilizer of the E. I. DuPont de Nemours, of Wilmington, Del.

In addition to the above-described silicone coated polycarbonate panels primed with polymethylmethacrylate and a mixture of Uvinul N-539 and one of the aforementioned stabilizers, polycarbonate panels were also treated with the polymethylmethacrylate primer free of the UV absorber and stabilizer followed by treatment with the colloidal silica filled organopolysiloxane. In addition, panels were prepared having UV absorber without stabilizer and panels were also prepared with stabilizer free of UV absorber.

The various panels were then subjected to QUV aging for a period of 504 hours, 840 hours, 1148 hours, 1182 hours and 1567 hours. The respective treated polycarbonate panels were scored with a Gitterschnittpufgerat and scotch tape was then applied to the scored area. Any separation of the silicone polymethylmethacrylate coating onto the tape indicated a breakdown between the primer layer and the surface of the polycarbonate. The following results were obtained:

| UV-Absorber | Added Stabilizer | Adhesion |
|---|---|---|
| None | None | Fail 504 |
| Uvinul N-539 | None | Pass 504, Fail 840 |
| Uvinul N-539 | 1% Cyasorb UV 1084 | Pass 1148, fail 1482 |
| None | " | Fail 504 |
| Uvinul N-539 | 1% Tinuvin 770 | Pass 1148, Fail 1482 |

-continued

| UV-Absorber | Added Stabilizer | Adhesion |
|---|---|---|
| None | " | Fail 504 |
| Uvinul N-539 | 1% Rylex NBC | Pass 1183, Fail 1567 |
| None | " | Fail 504 |

The above results show that polymethylmethacrylate primer containing a combination of the UV absorber and stabilizer substantially enhances the resistance to weathering as compared to polycarbonate panels treated with primer free of the combination of UV absorber and added stabilizer.

Although the above example is directed to only a few of the very many abrasion resistant silicone coated thermoplastic articles which can be made in the practice of the present invention, it should be understood that a much broader variety of thermoplastic substrates can be used in combination with other types of UV absorbers and stabilizers and combinations thereof as well as different acrylic polymers and silicone top coats which are shown in the description preceding this example.

What we claim as new and desire to secure by Letters Patent of the United States is:

1. Coated articles having improved weather and abrasion resistance comprising
    (A) a polycarbonate substrate,
    (B) a cured intermediate acrylic primer layer comprising
        (1) acrylic polymer and
        (2) 5% to 50% by weight of the cured intermediate acrylic primer layer of a mixture of 1 to 10 parts of a UV absorber selected from the class consisting of cyanoacrylate, hydroxybenzophenone and benzotriazole, per part of an organic or organometallic stabilizer selected from the class consisting of

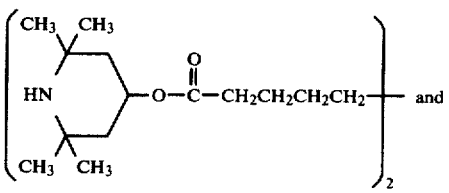

and

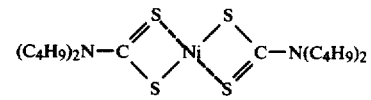

(C) a cured silicone top coat durably adhered to the polycarbonate substrate.

2. An article in accordance with claim 1, where the acrylic polymer of the cured intermediate acrylic primer layer is thermoplastic.

3. An article in accordance with claim 1, where the UV absorber is a cyanoacrylate.

4. An article in accordance with claim 1, where the stabilizer is

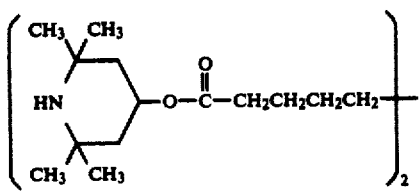

5. An article in accordance with claim 1, where the stabilizer is

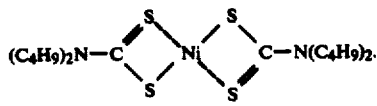

6. An article in accordance with claim 1, where the silicone top coat is a polymethylsiloxane.

7. An article in accordance with claim 6, in which the polymethylsiloxane contains colloidal silica.

8. A method for making coated polycarbonate articles which comprises, (1) priming a polycarbonate substrate with an acrylic primer composition comprising acrylic polymer and 5% to 50% by weight based on the weight of acrylic primer composition of a mixture comprising 1 to 10 parts of a UV absorber selected from the class consisting of cyanoacrylate, hydroxybenzophenone and benzotriazole, per part of an organic or organometallic stabilizer selected from the class consisting of

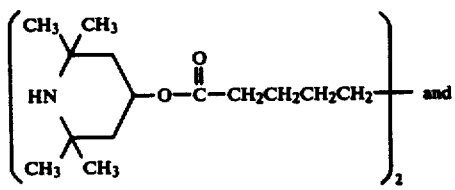

-continued

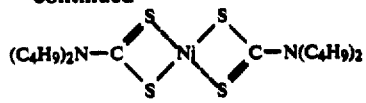

(2) applying a silicone coating composition onto the primed polycarbonate substrate and thereafter effecting the cure of the silicone coating composition to form a hard abrasion resistant coating composition.

9. A method in accordance with claim 8, where the thermoplastic substrate is a polycarbonate substrate.

10. A method in accordance with claim 8, where the silicone coating composition is a polymethylsiloxane.

11. A method for making a coated, non-opaque, abrasion resistant, thermoplastic articles which comprises, (1) priming a polycarbonate substrate with an acrylic primer composition comprising a polymethylmethacrylate and 5 to 50% by weight based on the weight of acrylic composition of a mixture consisting essentially of 1 to 10 parts of a cyanoacrylate UV absorber per part of a stabilizer selected from the class consisting of

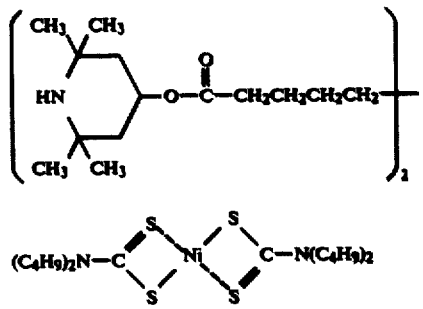

and mixtures thereof and (2) applying a polymethylsiloxane onto the primed polycarbonate substrate and thereafter effecting the cure of the polymethylsiloxane to form a hard abrasion resistant coating composition.

12. A method in accordance with claim 11, where the polymethylsiloxane coating composition contains a silica filler.

* * * * *